June 23, 1964    A. J. WHITE    3,138,224
BRAKE HAVING MEANS TO INDICATE WEAR
Filed April 30, 1962

INVENTOR.
Andrew J. White
BY Harold E. Cole
Attorney

United States Patent Office 3,138,224
Patented June 23, 1964

3,138,224
BRAKE HAVING MEANS TO INDICATE WEAR
Andrew J. White, Lee, N.H.
(Newmarket P.O., South Lee, N.H.)
Filed Apr. 30, 1962, Ser. No. 190,887
7 Claims. (Cl. 188—78)

This invention relates to a brake lining having visible indicating means to show the extent of wear.

In the servicing of automobile brakes it is difficult to determine when a brake lining should be replaced. The laws in some states require that a lining shall be replaced when it thins down to a point just less than 60% of its original thickness, nevertheless it is a problem how to determine when that point is reached.

Accordingly my principal object is to provide a brake lining with indicating means that will become visible while the brake lining is in position of use and forming part of the assembly to thereby show the extent of the wear that has taken place, hence whether or not there is need to renew the lining.

Another object is to make provision in said brake lining so that it can receive coloring material in a predetermined part where it will become visible when the brake lining is worn down to a certain point.

A further object is to provide such a brake lining with coloring material that will change color when the wear of the lining reaches the colored material.

A still further object is to provide such a brake lining that is simple to manufacture and use and the cost of which is relatively economical.

The foregoing and other objects which will appear as the nature of the invention is better understood, may be accomplished by a construction and arrangement such as is disclosed by the drawing. The nature of the invention is such as to render it susceptible to various changes and modifications, and, therefore, I am not to be limited to the construction disclosed by the drawing, nor to the particular parts described in the specification; but am entitled to all such changes therefrom as fall within the scope of my claims.

Figure 1:
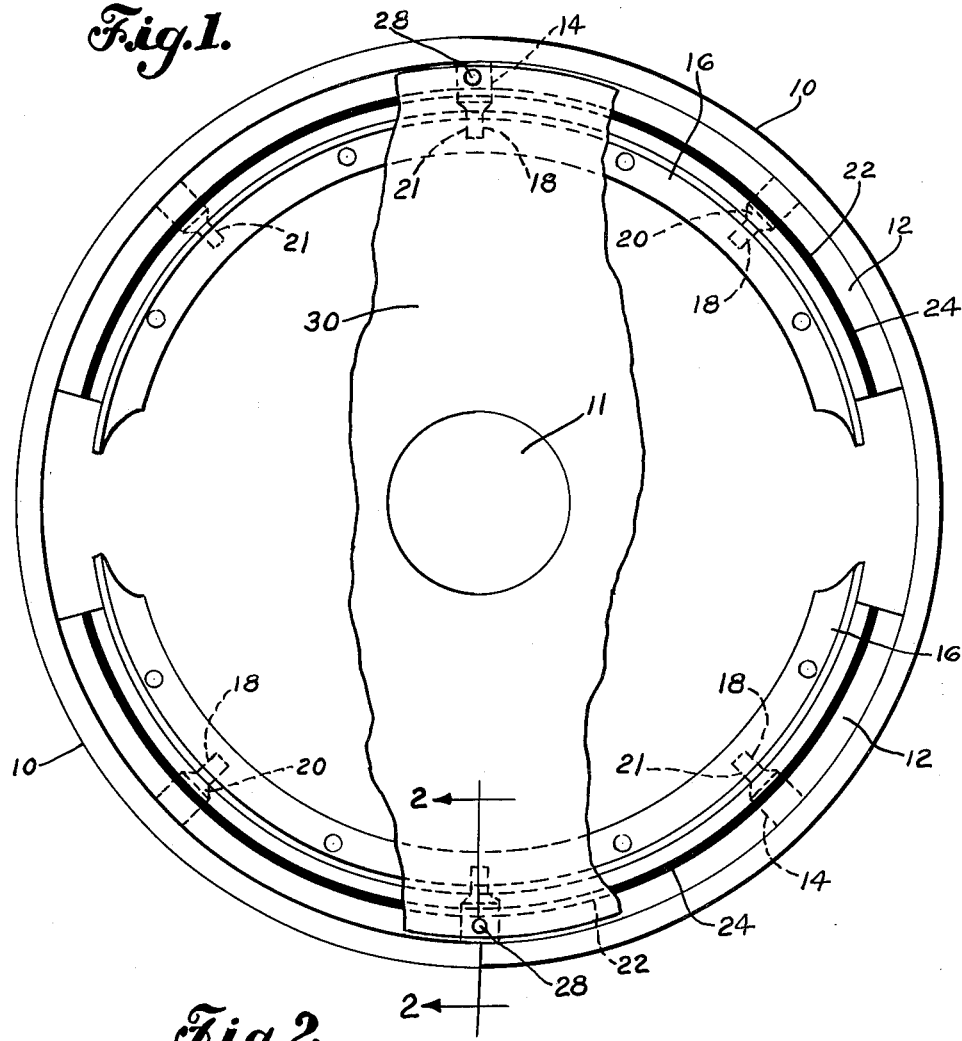
FIG. 1 is a side elevational view of a brake assembly showing my brake lining with a groove to receive colored material, showing part of the back plate broken away.
Figure 2:
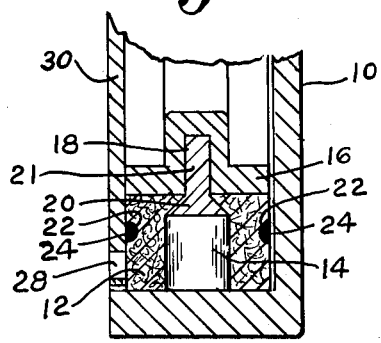
FIG. 2 is an enlarged, fragmentary, sectional view taken on the line 2—2 of FIG. 1.

As illustrated, my brake assembly has a well-known brake drum 10 having the usual central opening 11 to receive an axle not shown. Next to said brake drum is a brake lining 12 shown in two parts, the thickness of which I have exaggerated to better illustrate my invention. Holes 14 extend through said brake lining to receive the countersunk heads 20 of rivets 21, later described.

Inwardly of said brake lining 14 is a well-known brake shoe 16 shown in two parts, having holes 18 therein opposite said holes 14. Said rivets 21 extend through said holes 12 into said holes 18 thereby connecting said brake lining and said brake shoe. Said rivets are pressed into said position or otherwise serve to hold said brake lining and brake shoe together.

Extending from opposite side edges of said brake lining 12 inwardly a short distance, and spaced from a point laterally opposite said rivet head 20 are two grooves 22 into which is placed a well-known coloring material 24, such as paint, and that distinguishes from the color of the brake lining. These grooves 22 are located at the inner half portion of the thickness of said brake lining so that the latter will be more than one-half worn out before the coloring material 24 shows upon inspection of the brake lining. While I show two grooves, one could serve my purpose.

To make said coloring material visible when the brake lining is worn to a point where it should be seen, I provide an opening 28 through the usual back plate 30 outside said brake drum 10, thus enabling a person to examine the brake lining while the brake drum is in assembled position.

Said coloring material 24 may be any suitable, well-known paint or coloring material. However, in order to have said material change color when the brake lining is worn to the point where it is visible and therefore is subject to frictional contact with the brake drum I incorporate Lea's salts in the lining, for instance. That will respond to heat, due to friction aforesaid, and cause a change of color. If the lining were red in color, for instance, the change of color will be very noticeable.

What I claim is:

1. A brake assembly comprising a brake drum, a brake lining next to said drum, a brake shoe inwardly of said lining, means holding said drum, lining and shoe together, said lining having a groove extending inwardly from a side edge thereof and spaced from the outer extremity of said lining, and coloring material in said groove.

2. A brake assembly comprising a brake drum, a brake lining next to said drum, a brake shoe inwardly of said lining, means holding said drum, lining and shoe together, said lining having a groove extending inwardly from a side edge thereof and more than half way inwardly from the outer extremity of said lining, and coloring material in said groove.

3. A brake assembly comprising a brake drum, a brake lining next to said drum, a brake shoe inwardly of said lining, means holding said drum, lining and shoe together, said lining having two grooves extending inwardly from opposite side edges thereof and spaced from the outer extremity of said lining, and material in said grooves having a color that distinguishes from the color of the brake lining.

4. A brake assembly comprising a brake drum, a brake lining next to said drum, a brake shoe inwardly of said lining, means holding said drum, lining and shoe together, a back plate adjacent a side edge of said lining and having an opening therethrough whereby a side edge of said lining is visible, said lining having a groove extending inwardly from a side edge thereof and spaced from the outer extremity of said lining, and material in said groove that distinguishes it from the color of said brake lining.

5. A brake lining having a groove therein extending inwardly from a side edge thereof and spaced from the outer extremity thereof, and coloring material in said groove that distinguishes it from the color of the brake lining.

6. A brake lining having two grooves therein extending inwardly from opposite side edges thereof, and spaced from the outer extremity thereof, and coloring material in said grooves that distinguishes it from the color of the brake lining.

7. A brake assembly comprising a brake drum, a brake lining next to said drum, a brake shoe inwardly of said lining, means holding said drum, lining and shoe together, said lining having a groove extending inwardly from a side edge thereof and spaced from the outer extremity of said lining, and material in said groove adapted to change color in response to frictional contact with said drum.

References Cited in the file of this patent

UNITED STATES PATENTS

| | | |
|---|---|---|
| 2,077,695 | Horn | Apr. 20, 1937 |
| 2,644,551 | Glazebrook et al. | July 7, 1953 |

FOREIGN PATENTS

| | | |
|---|---|---|
| 448,223 | Great Britain | June 4, 1936 |